Feb. 11, 1964  C. H. WILLSEY  3,120,889
EGG HANDLING APPARATUS
Filed Oct. 18, 1960  2 Sheets-Sheet 1
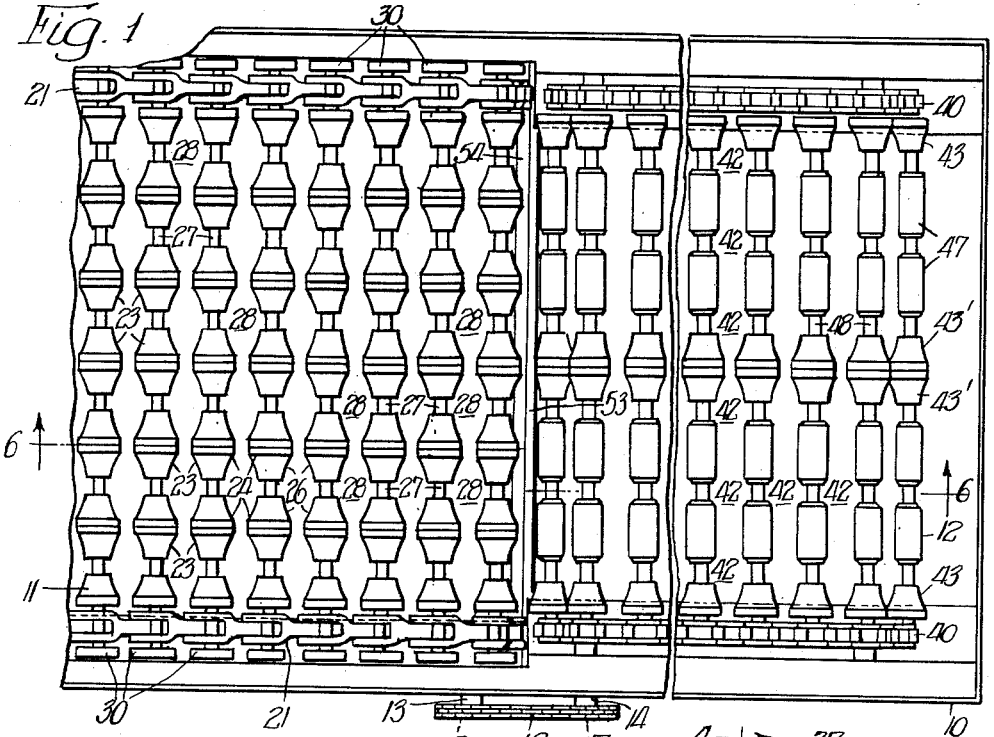
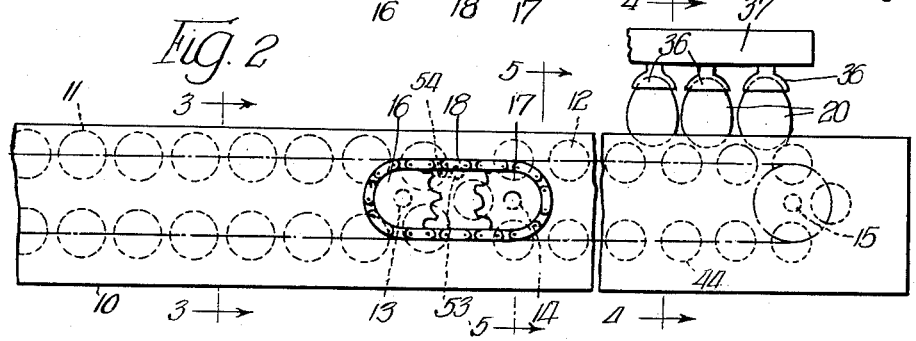
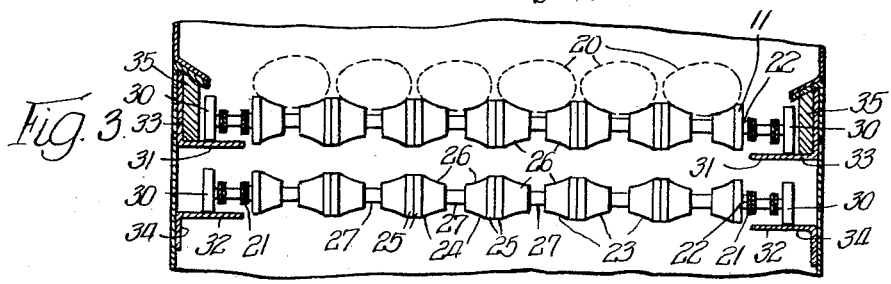
INVENTOR.
Charles H. Willsey,
BY
Cromwell, Greist & Warden
attys.

Feb. 11, 1964 C. H. WILLSEY 3,120,889
EGG HANDLING APPARATUS
Filed Oct. 18, 1960 2 Sheets-Sheet 2

INVENTOR.
Charles H. Willsey,
BY
Cromwell, Greist & Warden
Attys.

United States Patent Office 3,120,889
Patented Feb. 11, 1964

3,120,889
EGG HANDLING APPARATUS
Charles H. Willsey, Topeka, Kans., assignor to Seymour Foods, Inc., Topeka, Kans., a corporation of Kansas
Filed Oct. 18, 1960, Ser. No. 63,287
7 Claims. (Cl. 198—33)

This invention relates to egg handling machinery and is more particularly concerned with improvements in an apparatus for receiving eggs from a lifter or similar transfer device and for delivering the eggs in predetermined arrangement to the top run of a horizontal conveyor in a machine for washing or otherwise processing the eggs.

In the handling of eggs in a processing or packing plant, it is the general practice to first subject the eggs to a surface cleaning operation so as to remove the dirt usually found on the shells and any accompanying bacterial or germ contamination which may be present therein. Such cleaning operations may be most efficiently performed in a machine of the type which is described in applicant's copending application on an Egg Washing Machine, Serial No. 656,881, filed May 3, 1957, now Patent No. 2,979,746, granted April 18, 1961, wherein the eggs are carried on a conveyor beneath vertically reciprocating brushes which are positioned to strike the surfaces of the eggs as they are advanced beneath the same, with the conveyor being so constructed that the eggs are continually rotated about their longitudinal axis as they are advanced beneath the brushes so as to present the entire surface of each egg to the action of the brushes. The eggs are customarily delivered to the processing machines from standard 30 dozen or 24 dozen egg crates or cartons in which the eggs are arranged in tiers or layers and separated by flats and fillers. This means that the eggs are arranged with their axes vertical and on centers of approximately 1¾ inches. In the standard 30 dozen crate, the eggs in each layer are positioned in row alignment 6 rows of 6 eggs each. Various lifters are available commercially for removing the eggs from the crates, a layer at a time. One satisfactory type of lifter comprises rows of vacuum cups depending from a supporting member. The cups are engaged with the individual eggs and the vacuum applied so that the operator may remove in one operation a complete layer or tier from the egg crate. The entire layer may then be deposited on the conveyor of the processing machine by simultaneously releasing the vacuum in all of the cups when the lifter is positioned above the conveyor. However, a problem arises in connection with the release of the eggs on the processing machine conveyor because the latter is designed to carry the eggs with their axes extending horizontally so that they may rotate about the long axis as they are advanced by the conveyor. With the eggs arranged in this fashion, they are in rows approximately 2½ inch on centers. Thus when the eggs are deposited on the conveyor they must be realigned or repositioned so as to bring the long axis from a vertical to a horizontal position and they must also be spread out laterally of the conveyor so as to be properly spaced for rotation in the individual pockets formed between the traveling conveyor bars or roller supports. When the eggs are transferred directly to the processing machine conveyor by use of a vacuum lifter of the type described, there is a tendency for the eggs to pile up on the conveyor and not assume their proper spacing and realignment.

It is a general object, therefore, of the present invention to provide an apparatus which is adapted to be combined with the processing machine conveyor and which will receive the eggs from the vacuum lifters and automatically reorient and space them so that they are properly positioned when transferred to the pockets of the processing conveyor.

It is a more specific object of the invention to provide a feed conveyor for receiving eggs from a lifter where they are closely spaced and arranged with their axes in a vertical direction, which feed conveyor will reorient the eggs and arrange them in properly spaced rows with their axes horizontal so as to be delivered to pockets formed between transversely extending rotating cross bars on the main conveyor in proper position for rotation and advance by the latter.

It is a still more specific object of the invention to provide in an egg handling apparatus a supplemental feed conveyor for cooperation with the receiving end of a horizontally disposed main conveyor on which the eggs are adapted to be advanced while being rotated about their horizontal axes in transversely spaced pockets formed between pairs of traveling cross bars on the main conveyor.

These and other objects and advantages of the invention will be apparent from a consideration of the apparatus which is shown by way of illustration in the accompanying drawings wherein:

FIGURE 1 is a plan view, with portions broken away, of the end of an egg handling machine having an egg repositioning and feeding conveyor structure which embodies the principles of the invention;

FIGURE 2 is a side elevation of the mechanism shown in FIGURE 1, with portions broken away and other portions shown schematically;

FIGURE 3 is a cross section taken on the line 3—3 of FIGURE 2;

Figure 4:
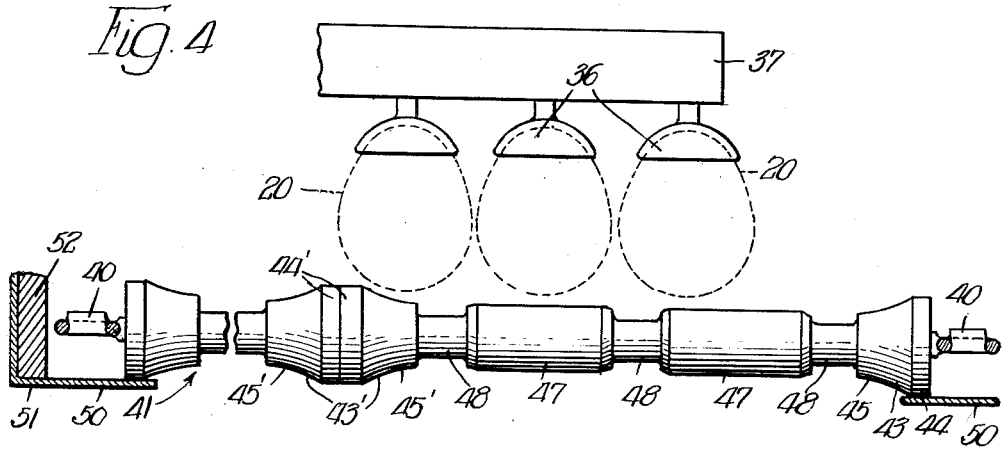
FIGURE 4 is a fragmentary cross section taken on the line 4—4 of FIGURE 2, to an enlarged scale and with portions broken away.

The apparatus of the present invention will be described in connection with the transfer of eggs from a conventional egg case or crate, for example the standard 30 dozen wooden crate commonly used for bulk shipments, to the egg supporting main conveyor described in the copending application, Serial No. 656,881, now Patent No. 2,979,746. It will be understood, however, that the invention is not limited to egg cleaning or washing apparatus but may be employed with any other egg processing apparatus.

Referring first to FIGURES 1 and 2 of the drawing, there is illustrated an end portion of a supporting frame 10 having mounted thereon for movement in a generally horizontal plane the main egg supporting conveyor 11 and a cooperating supplemental egg feeding and repositioning conveyor 12 which constitutes one embodiment of the present invention.

The conveyor 11 is supported at the receiving end thereof on a cross shaft 13 with the other end being supported on a similar shaft (not shown). The conveyor 12, which may be relatively short, is supported on a pair of parallel cross shafts 14 and 15. The cross shafts 13 and 14 are extended at corresponding ends and provided with sprockets 16 and 17 having a connecting drive chain 18 so that the two conveyors are operated in synchronism. A suitable power drive (not shown) may be connected to either conveyor.

The main conveyor 11 for advancing the eggs 20 through the processing or handling machine comprises a pair of oppositely disposed, transversely spaced side chains 21 (FIGURES 1 and 3) which are connected by a series of longitudinally spaced, transversely extending rod or bar members 22. Each of the cross bar members 22 carries six pairs of egg supporting roller assemblies 23. The roller assemblies 23 are identical and arranged on the cross bars 22 in abutting relation. The overall length in the axial direction of the bar member 22 of each roller assembly 23 is somewhat greater than the length of the largest egg 20 which the machine is designed to carry, the eggs 20 being adapted to be supported with their long axes in a generally horizontal plane and in relatively closely spaced relation. Each of the roller assemblies 23 comprises a spaced pair of identical roller sections 24 having a base 25 with a cylindrical periphery and an adjoining portion 26 which extends from the base 25 in the axial direction of the cross bar 22 and which has a peripheral contour which is convexly curved so that each portion 26 has the general form of a truncated cone with the peripheral curvature being roughly complementary to the exterior curvature of the end portion of the egg shell of average size and shape. The two egg supporting roller sections 24 of each pair thereof are arranged with the portions 26 in confronting relation and spaced an appreciable distance axially on the cross bar 22, providing a space 27 between the ends thereof in which the egg 20 is free of contact with the roller sections 24 so as to permit circulation of air over the central portion of the surface of the egg 20 for drying purposes.

The cross bar members 22 which carry the roller assemblies 23 are spaced from each other in the longitudinal direction of the conveyor so that each assembly 23 cooperates with the aligned assembly on the adjoining cross bar 22 to form therewith a pocket 28 for receiving and confining an egg 20 while the cross bar members 22 are traveling on the uppermost run of the conveyor.

The cross bar members 22 are each rotatably connected with the chains 21 and have the ends thereof extending outwardly of the same. Friction rollers 30 are secured on the ends of each of the cross bar members 22, outboard of the chains 21 which ride on oppositely disposed track members having inwardly directed roller supporting guide flanges 31 and 32 provided by angle bar support members 33 and 34. The angle bar support members 33 and 34 are secured on the walls of the main frame 10 with the guide flanges 31 and 32 in horizontal, vertically spaced relation so as to support the upper and lower runs of the conveyor for travel in a horizontal plane. The rollers 30 are, of course, frictionally driven by engagement with the guide flanges 31 and 32 and rotate the cross bars 22 thereby axially rotating the eggs 20 which are in the pockets 28. Bumper guide rails 35 are carried on the angle support members 33 outwardly of the rollers 30 which prevent excess lateral movement of the conveyor.

The supplemental conveyor 12 initially receives the eggs 20 which are placed thereon when they are released by breaking the vacuum in the cups 36 of a vacuum lifter device 37. The conveyor 12 comprises a pair of laterally spaced side chains 40 which are connected by a series of longitudinally spaced, transversely extending rod or bar members 41. Each of the cross bar members 41 carries a pocket forming structure which cooperates with a like structure on each of the next adjacent cross bar members so that a pair of cross bars provides a total of six egg receiving pockets 42 across the width of the conveyor. The pocket forming structure on each of the cross bar members 41 is to some extent similar to the pocket forming roller assemblies 23 on the cross bar members 22.

Each of the cross members 41 carries at its opposite ends a cylindrical section or member 43 which is shaped like the cylindrical roller section 24 on the cross bars 22. Each of these end members 43 has the general form of a truncated cone with a cylindrical base portion 44 and an inwardly directed adjoining portion 45 which extends from the base portion 44 in the axial direction of the cross bar 41 and which is convexly curved, with the peripheral curvature being roughly complementary to the exterior curvature of the end portion of an egg shell of average size and shape. Two cylindrical members 43' having the same shape as the end members 43 are provided in base-to-base arrangement on the center of the bar 41 with the base portions 44' thereof in engagement and the curved portions 45' extending in opposite directions. The space between the center members 43' and the end members 43 on each side of the pair of center members is divided in an identical manner by two cylindrical members 47 which are of approximately the same diameter in cross section as the minimum cross sectional diameter of the members 43 and 43'. The cylindrical members 47 are separated from each other and from the members 43 and 43' by cylindrical members or cross bar sections 48 which have a cross sectional diameter somewhat less than the diameter of the members 47. The members 47 are arranged on the bar members 41 to provide egg accommodating pockets 42 which are spaced to correspond with the spacing of the egg receiving pockets 28 on the conveyor 11. With the described construction, each of the cross bar members 41 is provided with a center portion which is of hub-like form and the space on each side thereof is divided into three egg pockets 42 (FIGURE 1).

The cross bar members 41 are each rotatably connected at opposite ends with the supporting chains 40. The base portions 44 of the end members 43 frictionally engage horizontally disposed, inwardly extending track forming flanges 50 of angle bar support members 51 which are secured on the walls of the frame 10. The bar members 41 and their associated pocket forming members are, of course, rotated by the frictional engagement of the end members 43 with the flanges 50 and the eggs 20 are rotated by engagement with the members 43', 47 and 43 on the bar members. Bumper guide rails 52 are carried on the angle bar support members 51 which prevent lateral movement of the conveyor 12.

The two conveyors 11 and 12 are arranged in longitudinal alignment with their upper runs in substantially the same horizontal plane and the adjacent end supporting shafts 13 and 14 are spaced so as to provide clearance between the adjacent ends of the conveyors for movement of the cross bars 22 and 41 without interference. A supplemental support is provided for the eggs 20 as they are transferred from the end of conveyor 11 to the end of conveyor 12 which supplemental support comprises a fixed cross bar or rod member 53 extending between the side walls of the main frame 10 and a relatively narrow, horizontally disposed shelf-like pad member 54 which extends radially of the long axis of the fixed bar member 51 in the direction of the conveyor 11 with its free edge 55 having a contour corresponding approximately to the contour of the egg engaging surface provided by the pocket forming roller assemblies 23 on the conveyor cross bars 22 and being spaced outwardly of the path thereof a sufficient distance so as to permit free movement of the cross bars 22 past the edge 55 of the pad member 54 when the conveyor 11 is operated. The fixed transfer bar member 53, which is parallel with the cross shafts 13 and 14, is centered between the shafts 13 and 14 below the longitudinal center lines of the chains when they are traversing the upper runs of the conveyors and above the horizontal plane in which the shafts 13 and 14 are located. The rotation of the eggs 20 which is imparted by the rotation of the cross bar members 41 on the conveyor 12 tends to roll the eggs across the transfer bar 53 and pad 54 into the pockets 28 on the conveyor 12.

The cross bars 22 and 41 may both be formed with a metal core and the pocket forming members of rubber, synthetic rubber, plastics, or the like may be cast thereon as a single member or the latter may be formed in sections and secured on the bar stock in any desired manner.

Figure 5:
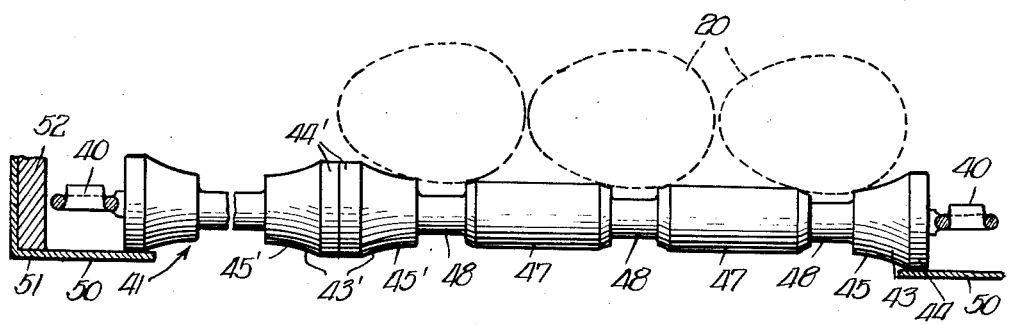
FIGURE 5 is a fragmentary cross section taken on the line 5—5 of FIGURE 2, to an enlarged scale, and with portions broken away.
Figure 6:
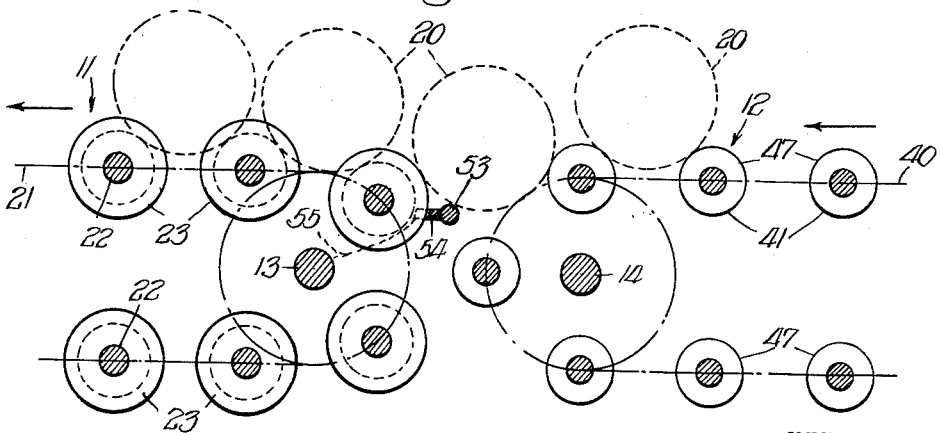
FIGURE 6 is a fragmentary cross section taken on the line 6—6 of FIGURE 1, to an enlarged scale, showing the relative position of the two conveyors at the transfer point, and with portions thereof shown schematically.

In using the apparatus the eggs 20 are removed from the egg case by the vacuum lifter 37 and initially positioned over the upper run of the conveyor 12 as shown in FIGURE 2. The vacuum in the egg gripping cups 36 is then released and the eggs are discharged onto the top run of the conveyor 12. The hub forming center portions on the cross bars 41 are employed as a guide for the operator to position the vacuum lifter relative to the conveyor 12 so that when the eggs 20 are released three eggs will be deposited on each side of the center hub formation. This positions three eggs on each side of the center of the cross bars for alignment or orientation into the pockets 42 formed between each pair of bars. The repositioning of the eggs, from a vertically disposed position (FIGURE 4) in which they are released for deposit on the conveyor to a horizontally disposed position (FIGURE 5) in which they are delivered to the main conveyor 11, is accomplished by rotation of the cross bars 41, the eggs tending, when rotated, to assume a position in which the long axis is horizontal and the three eggs at each side of the center of the conveyor tending to roll into the pockets 42 smoothly and without any jamming or crushing.

While particular materials and specific details of construction have been referred to in describing the preferred form of the apparatus, it will be understood that other materials and different details of construction may be resorted to within the spirit of the invention.

I claim:

1. In an egg handling machine having an upright supporting frame, an egg carrying and orienting conveyor arranged on said frame with one of its runs traveling in a horizontal plane, said conveyor comprising a pair of laterally spaced chains and end supports mounted at opposite ends of said upright frame, a plurality of parallel, longitudinally spaced cross shafts journaled at opposite ends on the conveyor chains, a traction member on each of said cross shafts, a stationary track on said supporting frame which is engaged by the traction members on the cross shafts to rotate the latter, a plurality of sets of pocket forming roller members fixed on each cross shaft in cooperating relation for receiving thereon eggs to be carried by the conveyor, each set of roller members on each cross shaft being aligned in the direction of travel of the conveyor with a like set of the roller members on the adjoining cross shaft and cooperating therewith to form three lines of pockets on each side of the longitudinal center of the conveyor for receiving the eggs, the roller members at the center of each cross shaft comprising a cylindrical base portion and an adjoining portion of truncated cone shape with the surface thereof convexly curved in the direction of the axis of rotation, said center roller members being positioned on the cross shaft in base-to-base engagement, a like roller member at each end of the cross shaft with the base portions outermost and a pair of elongate cylindrical members arranged in axially spaced relation between the center and end roller members, each of said elongate cylindrical roller members having a substantially uniform diameter corresponding to the external diameter of the confronting ends of the center and end roller members, and spacer members of smaller diameter and shorter length in the spaces between said cylindrical members and said center and end roller members whereby the eggs are oriented by rotation of the cross shafts and moved outwardly of the center of the conveyor into transverse row forming end-to-end relation.

2. In an egg handling machine having a supporting frame, an egg carrying and orienting conveyor arranged on said supporting frame with one of its runs traveling in a horizontal plane, said conveyor comprising a pair of laterally spaced chains, end supports on said frame for said chains, a plurality of parallel cross shafts journaled at opposite ends on the chains and spaced apart in the direction of travel of said conveyor, means to rotate said cross shafts as said conveyor advances along said horizontal run, roller assemblies supported in fixed position on said cross shafts for receiving thereon eggs to be carried by the conveyor, the roller assemblies on each cross shaft being aligned in the longitudinal direction with roller assemblies on the adjoining cross shafts and cooperating therewith to form three lines of pockets on each side of the longitudinal center of the conveyor for receiving the eggs, each roller assembly comprising a center pair of roller sections with cylindrical base portions of the same diameter in back-to-back arrangement and adjoining tapered surface portions of truncated cone shape with the tapered surfaced portions being inclined in the direction of the axis of the supporting shaft and facing opposite ends of the shaft, a like roller section at each end of the shaft with the tapered surface portion facing inwardly, two elongate cylindrical roller sections of approximately the same external diameter as the external diameter at the small end of said tapered surface portions arranged in axially spaced relation between the center sections and each end section, the portions of the shaft between the roller sections being of lesser length and smaller in diameter than said cylindrical roller sections whereby rows of eggs placed thereon in transversely centered relation are oriented by rotation of the cross shafts and moved towards opposite sides of the conveyor into row forming relation with their long axes generally parallel to the axes of rotation of the cross shaft.

3. In an egg handling machine having an upright supporting frame, an egg carrying and orienting conveyor arranged on said frame with one of its runs traveling in a horizontal plane, said conveyor comprising a pair of laterally spaced chains and end supports mounted at opposite ends of said upright frame, a plurality of parallel, longitudinally spaced cross shafts journaled at opposite ends on the conveyor chains, traction means on each of said cross shafts and a cooperating stationary track on said supporting frame which is engaged by the traction means to rotate the cross shafts, a plurality of pocket forming members mounted in fixed relation on each cross shaft in cooperating relation for receiving thereon eggs to be carried by the conveyor, said pocket forming members on each cross shaft being aligned in the direction of travel of the conveyor with like members on the adjoining cross shaft and cooperating therewith to form pockets for receiving rows of eggs which are arranged in closely spaced relation with their long axes disposed vertically, the pocket forming members at the center of each shaft comprising a cylindrical base portion and an adjoining tapered surface portion of truncated cone shape which extends in the direction of the axis of the shaft and toward the end of the shaft, a like pocket forming member at each end of the shaft with the base portions outermost and elongate cylindrical members of substantially uniform diameter arranged in axially spaced relation between the center and end pocket forming members, each of said elongate cylindrical members having an external diameter corresponding to the external diameter of the confronting end of the center and end pocket forming members, and spacer members of smaller diameter and shorter length between said cylindrical members and said center and end pocket forming members, the centers of the pockets thus formed being spaced apart a distance sufficient to accommodate the eggs in end-to-end relation when they are oriented by rotation of the cross shafts to bring their long axes into generally parallel relation with the axis of rotation of the cross shafts.

4. In a multiple row egg handling machine having an upright supporting frame, an egg carrying traveling conveyor arranged on said frame with its uppermost run in a horizontal plane, said egg carrying conveyor comprising a pair of laterally spaced chains mounted on supporting sprockets at opposite ends of said upright frame, a plurality of parallel, longitudinally spaced cross shafts journaled at opposite ends on the conveyor chains, means to rotate said cross shafts as said conveyor advances, a plurality of sets of pocket forming roller members fixed on each cross shaft, each set of roller members on each cross shaft being aligned in the direction of travel of the conveyor with a like set of the roller members on the adjoining cross shaft and cooperating therewith to form pockets for receiving the eggs in end-to-end row forming relation, the roller members of each set thereof each comprising a cylindrical base portion and an adjoining tapered portion of truncated cone shape, said roller members of each set thereof being positioned in spaced relation on the shaft with the tapered portions in confronting relation so as to form between adjoining shafts a plurality of cradle-like pockets for receiving eggs in end-to-end relation with their long axes substantially horizontal, an egg orienting conveyor arranged on said frame with its uppermost run in the same plane as said egg carrying conveyor, said orienting conveyor comprising laterally spaced side chains mounted on longitudinally spaced end sprockets with the sprockets at the discharge end adjacent the sprockets at the receiving end of said carrying conveyor, said orienting conveyor having a plurality of longitudinally spaced, parallel cross bars journaled at opposite ends on the side chains, means to rotate said cross bars as said orienting conveyor advances, each of said cross bars having pocket forming members mounted thereon which are longitudinally aligned to form egg receiving pockets between each cross bar and the next adjacent cross bar, said pocket forming members at the center of the cross bar comprising cylindrical base portions and oppositely directed truncated cone shaped portions, a like pocket forming member at each end of the cross bar with the base portions outermost and a pair of elongate cylindrical members arranged in axially spaced relation between the center and end pocket forming members, each of said elongate cylindrical members having a diameter corresponding to the diameter of the confronting end of the center and end pocket forming members, and cylindrical spacer members of smaller diameter and shorter length in the spaces between said elongate cylindrical members and said center and end pocket forming members whereby rows of closely spaced eggs which are disposed with their long axis vertically may be deposited on said orienting conveyor which will rotate the eggs and simultaneously guide them into the pockets of said orienting conveyor with their axes substantially horizontal for delivery at the discharge end thereof to the pockets of said carrying conveyor in aligned rows.

5. In a multiple row egg handling machine having an upright supporting frame, an egg carrying traveling conveyor arranged on said frame with an upper run thereof generally horizontal, said egg carrying conveyor comprising a pair of laterally spaced chains mounted on supporting sprockets at opposite ends of said upright frame, a plurality of parallel, longitudinally spaced cross shafts journaled at opposite ends on the conveyor chains, means to rotate said cross shafts as said conveyor advances, a plurality of sets of pocket forming members on each cross shaft in cooperating relation for receiving thereon eggs to be carried by the conveyor, each set of pocket members on each cross shaft being aligned in the direction of travel of the conveyor with a like set of the pocket members on the adjoining cross shaft and cooperating therewith to form upwardly facing pockets for receiving the eggs, the pocket members of each set thereof each comprising a cylindrical base portion and an adjoining tapered portion of truncated cone shape and being positioned in spaced relation on the shaft with the tapered portions in spaced confronting relation so as to form a cradle for receiving an egg between the same, an egg orienting conveyor arranged on said frame with an upper run thereof horizontal, said orienting conveyor comprising laterally spaced side chains mounted on longitudinally spaced end sprockets with the sprockets at the discharge end being mounted adjacent the sprockets at the receiving end of said carrying conveyor, said orienting conveyor having a plurality of longitudinally spaced, parallel cross bars journaled at opposite ends on the side chains, means to rotate said cross bars as said orienting conveyor advances, each of said cross bars having pocket forming members thereon which are longitudinally aligned to form egg receiving pockets between each cross bar and the next adjacent cross bar, said pocket members at the center of the cross bar comprising cylindrical base portions and oppositely directed truncated cone shaped portions, pocket forming members at the ends of the cross bars having cylindrical base portions which are outermost and truncated cone shaped portions extending inwardly thereof, and a pair of elongate cylindrical members arranged in axially spaced relation between the center and end pocket members, each of said elongate cylindrical members having a diameter corresponding approximately to the diameter of the confronting end of the center and end pocket members, and relatively short cylindrical spacer members of smaller diameter between said elongate cylindrical members and said center and end pocket members, whereby when rows of eggs in closely spaced relation and with their long axes disposed vertically are deposited on said orienting conveyor the eggs on each side of the center pocket forming member will move outwardly and into end-to-end relation in the pockets on each side of the center with their long axes disposed horizontally and with each egg aligned for transfer to a pocket on the carrying conveyor.

6. In a multiple row egg handling machine having an upright supporting frame, an egg carrying traveling conveyor mounted on end supports on said frame with its uppermost run in a horizontal plane, said egg carrying conveyor comprising a plurality of parallel, longitudinally spaced, rotatably mounted cross shafts, means to rotate said cross shafts, a plurality of sets of pocket forming roller members fixed on each of said cross shafts and aligned in the direction of travel of the conveyor with a cooperating set of the roller members on the adjoining cross shaft so as to form upwardly opening pockets which are spaced in the direction transversely of the conveyor so as to accommodate a row of eggs in end-to-end alignment with their long axis extending generally parallel with the corresponding axis of the cross shafts, and a supplemental conveyor for orienting and aligning eggs for delivery to said carrying conveyor which supplemental conveyor is mounted with its uppermost run in the same horizontal plane as the corresponding run of said carrying conveyor and traveling at the same speed, the supplemental conveyor being aligned longitudinally with said carrying conveyor and having a discharge end adjacent the receiving end of said carrying conveyor, said supplemental conveyor having spaced rotatable cross shafts with means thereon forming egg receiving pockets between pairs of said cross shafts which supplemental conveyor pockets are spaced transversely of the conveyor according to the spacing of the pockets of the carrying conveyor, said pocket forming means on said supplemental conveyor being constructed to receive rows of eggs which are arranged in closely spaced relation with their long axis extending vertically, the pocket forming members at the center of each cross shaft on the supplemental conveyor comprising a cylindrical base portion and an adjoining tapered surface portion of truncated cone shape which extends in the direction of the axis of the associated shaft and toward the end thereof, and elongate cylindrical members of substantially uniform diameter arranged in axially spaced relation on each side of the center pocket forming members, each of said elongate cylindrical members having an external diameter corresponding to the external diameter of the confronting ends of the center pocket forming members, and spacer members of smaller diameter and shorter length than said cylindrical members between each of said cylindrical members and the adjoining pocket forming members, the centers of the pockets thus formed being spaced apart a distance sufficient to accommodate the eggs in end-to-end relation when they are oriented by rotation of the cross shafts to bring them into said pockets with their long axes in generally parallel relation with the axis rotation of the cross shafts and in position for transfer to the pockets of the carrying conveyor in row alignment.

7. In a multiple row egg handling machine having an upright supporting frame, an egg carrying traveling conveyor mounted on end supports on said frame with its uppermost run generally horizontal, said egg carrying conveyor comprising a plurality of parallel, longitudinally spaced, rotatably mounted cross shafts, means to rotate said cross shafts, a plurality of sets of pocket forming members fixed on each of said cross shafts and aligned in the direction of travel of the conveyor with a cooperating set of like members on the adjoining cross shaft so as to form upwardly opening pockets between the shafts for supporting therein the eggs in end-to-end relation with their long axis extending generally parallel with the corresponding axis of the cross shafts and in uncrowded condition, and a supplemental conveyor for orienting and aligning eggs for delivery to said carrying conveyor which supplemental conveyor is mounted with its uppermost run generally horizontal and aligned longitudinally with said carrying conveyor and said supplemental conveyor having a discharge end adjacent the receiving end of said carrying conveyor, said supplemental conveyor having parallel spaced rotating cross bars and members thereon forming egg receiving pockets between pairs of the cross bars which are spaced transversely of the conveyor according to the spacing of the pockets of the carrying conveyor, the pocket forming members at the center of the cross bar on the supplemental conveyor comprising cylindrical base portions and oppositely directed cone-shaped portions and a pair of elongate cylindrical members arranged in axially spaced relation on opposite sides of the center pocket forming members, each of said cylindrical members having a diameter corresponding approximately to the diameter of the outwardly facing ends of the center pocket members and relatively short cylindrical spacer members of smaller diameter than said cylindrical members between each said cylindrical member and the adjoining pocket forming member whereby when rows of eggs in closely spaced relation and with their long axes disposed vertically are deposited on the supplemental conveyor the eggs in each row thereof will be divided and moved outwardly in opposite directions on opposite sides of the center of the conveyor while the eggs are rotated so as to orient the eggs and guide them into the individual pockets of the supplemental conveyor in end-to-end relation with their long axes disposed horizontal and with the eggs aligned longitudinally of the conveyor for delivery into the pockets of the carrying conveyor in properly spaced uncrowded condition.

References Cited in the file of this patent

UNITED STATES PATENTS

| | | |
|---|---|---|
| 626,284 | Lyons | June 6, 1899 |
| 1,728,462 | Wyland | Sept. 17, 1929 |
| 2,070,980 | Wyland | Feb. 16, 1937 |
| 2,536,961 | Smith | Jan. 2, 1951 |
| 2,961,087 | Reading | Nov. 22, 1960 |
| 2,979,746 | Willsey | Apr. 18, 1961 |
| 2,987,991 | Johnson | June 13, 1961 |